(12) United States Patent
Kim (10) Patent No.: US 11,939,873 B2
(45) Date of Patent: Mar. 26, 2024

(54) COMPANDER

(71) Applicant: HANWHA POWER SYSTEMS CO., LTD., Changwon-si (KR)

(72) Inventor: Kil Young Kim, Changwon-si (KR)

(73) Assignee: HANWHA POWER SYSTEMS CO., LTD, Changwon-si (KR)

( * ) Notice: Subject to any disclaimer, the term of this patent is extended or adjusted under 35 U.S.C. 154(b) by 0 days.

(21) Appl. No.: 17/925,111

(22) PCT Filed: May 11, 2021

(86) PCT No.: PCT/KR2021/005874
§ 371 (c)(1),
(2) Date: Nov. 14, 2022

(87) PCT Pub. No.: WO2021/230616
PCT Pub. Date: Nov. 18, 2021

(65) Prior Publication Data
US 2023/0175413 A1  Jun. 8, 2023

(30) Foreign Application Priority Data
May 15, 2020  (KR) .................. 10-2020-0058192

(51) Int. Cl.
*F01D 15/10* (2006.01)
*F01D 15/12* (2006.01)
*F01K 25/10* (2006.01)

(52) U.S. Cl.
CPC ............ *F01D 15/12* (2013.01); *F01D 15/10* (2013.01); *F01K 25/103* (2013.01)

(58) Field of Classification Search
CPC ........... F01D 15/10; F01D 15/12; F01D 25/10
See application file for complete search history.

(56) References Cited

U.S. PATENT DOCUMENTS

| 4,473,754 A | * | 9/1984 | Joy | ........................... F02C 7/36 290/43 |
| 10,570,783 B2 | * | 2/2020 | Wygant | ................ H02K 7/1823 |
| 2011/0209496 A1 | | 9/2011 | Horlyk et al. | |

FOREIGN PATENT DOCUMENTS

| DE | 10 2015 001 418 A1 | 8/2016 |
| EP | 1 205 721 A1 | 5/2002 |
| EP | 2 128 448 A2 | 12/2009 |
| KR | 10-2017-0073291 A | 6/2017 |
| KR | 10-2018-0031217 A | 3/2018 |

(Continued)

OTHER PUBLICATIONS

International Search Report (PCT/ISA/210) dated Aug. 25, 2021, issued by the International Searching Authority in counterpart International Application No. PCT/KR2021/005874.

(Continued)

*Primary Examiner* — Steven M Sutherland
(74) *Attorney, Agent, or Firm* — Sughrue Mion, PLLC (57) ABSTRACT

A compander comprises a bull gear connected to a generator a first pinion member comprising at least one first pinion provided on one side of the bull gear; and a second pinion member comprising at least one second pinion provided on the other side of the bull gear, wherein a first compressor and a first expander are mounted on the first pinion of the first pinion member, and a second compressor and a second expander are mounted on the second pinion of the second pinion member.

5 Claims, 8 Drawing Sheets

(56) References Cited

FOREIGN PATENT DOCUMENTS

| KR | 10-2019-0062103 A | 6/2019 |
|----|-------------------|--------|
| KR | 10-2019-0132915 A | 11/2019 |
| WO | 2020/181137 A1 | 9/2020 |

OTHER PUBLICATIONS

Written Opinion (PCT/ISA/237) dated Aug. 25, 2021, issued by the International Searching Authority in counterpart International Application No. PCT/KR2021/005874.
Extended European Search Report dated Oct. 19, 2023, issued by European Patent Office in European Patent Application No. 21803403.1.

* cited by examiner

COMPANDER

TECHNICAL FIELD

The present disclosure relates to a compander, and more particularly, to a stable and highly efficient compander using an integral geared (IG) method to improve efficiency in a power generation system utilizing, for example, supercritical $CO_2$ ($sCO_2$).

BACKGROUND ART

Figure 1A:
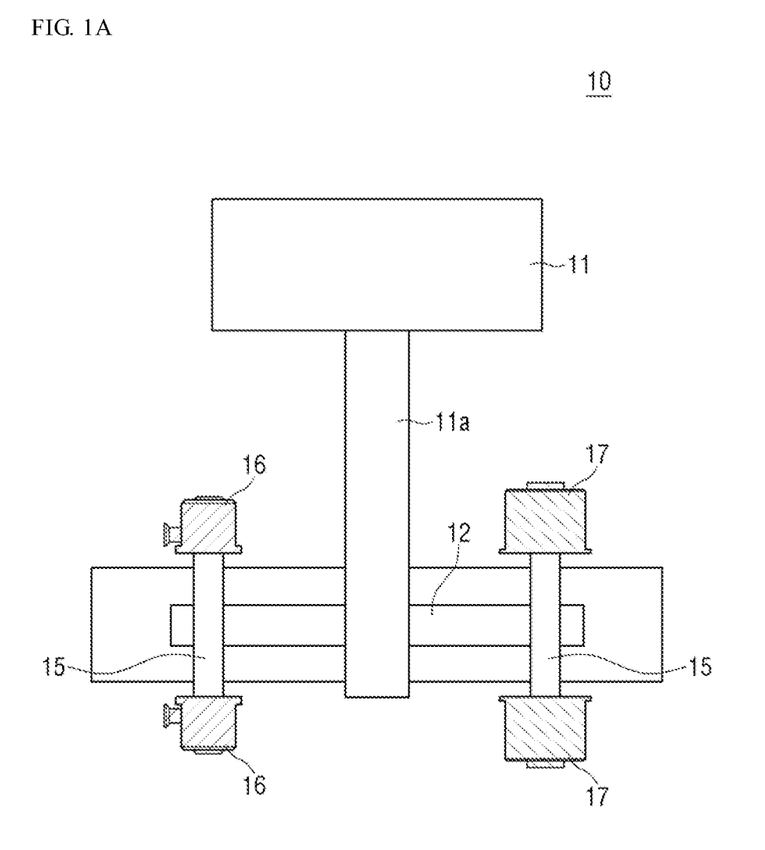
FIG. 1A schematically illustrates the planar arrangement of a gearbox having compressors and expanders in a general integral geared (IG) type compander.
Figure 1B:
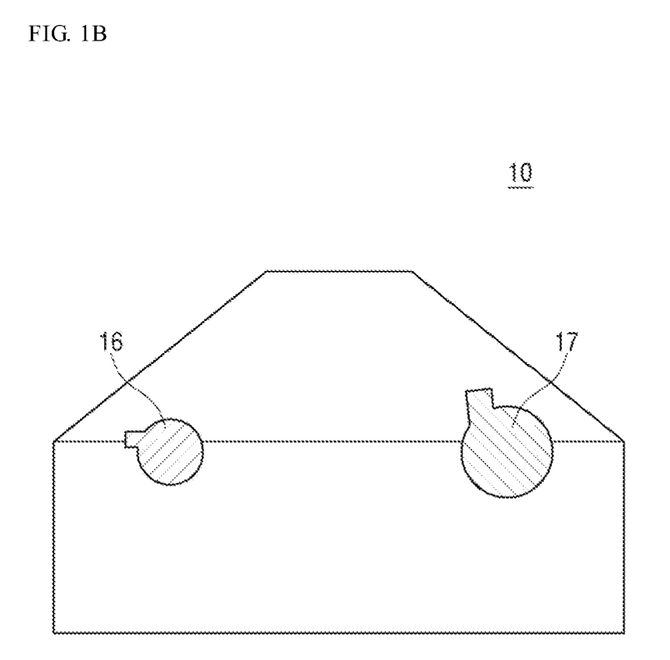
FIG. 1B schematically illustrates the front arrangement of the gearbox having the compressors and the expanders in the general IG type compander.

FIG. 1A schematically illustrates the planar arrangement of a gearbox having compressors 16 and expanders 17 in a general integral geared (IG) type compander 10. FIG. 1B schematically illustrates the front arrangement of the gearbox having the compressors 16 and the expanders in the general IG type compander 10.

Referring to FIGS. 1A and 1B, the general IG type compander 10 includes the compressors 16 and the expanders respectively provided on one side and the other side of a bull gear 12 connected to a generator 11. That is, a first pinion gear 15 connected to one side of the bull gear 12 may be configured on the one side of the bull gear 12, and a first stage compressor 16 and a second stage compressor 16 may be mounted at both ends of the first pinion gear 15, respectively. In addition, a second pinion gear 15 connected to the other side of the bull gear 12 may be configured on the other side of the bull gear 12, and a first stage expander 17 and a second stage expander 17 may be mounted at both ends of the second pinion gear 15, respectively.

In the compander 10 having the above gearbox configuration, the pressure and temperature of a working fluid (usually $CO_2$) increases from the first stage compressor 16 toward the second stage compressor 16. In addition, the pressure and temperature of the working fluid decreases from the first stage expander 17 toward the second stage expander 17.

For example, the temperature and pressure at an inlet of the first stage compressor 16 are 30 C/80 bar, respectively, and the temperature and pressure at an outlet of the first stage compressor 16 are 40 C/150 bar, respectively. In addition, the temperature and pressure at an inlet of the second stage compressor 16 are 40 C/150 bar, respectively, and the temperature and pressure at an outlet of the second stage compressor 16 are 50 C/230 bar, respectively.

In addition, in the case of the expanders 17, the temperature and pressure at an inlet of the first stage expander 17 are 400 C/220 bar, and the temperature and pressure at an outlet of the first stage expander 17 are 350 C/140 bar. In addition, the temperature and pressure at an inlet of the second stage expander 17 are 350 C/140 bar (when there is no other device such as a heater), and the temperature and pressure at an outlet of the second stage expander 17 are 290 C/80 bar.

Since the fluid ($CO_2$) used in the compressors 16 and the expanders 17 has high density by its nature, thrust from the fluid is quite large. Therefore, in order to reduce the thrust, a method of reducing thrust by reducing the load on a bearing using a shrouded (closed) impeller or an eye seal is used.

Efforts are made to reduce thrust with a similar concept whether in the compressors 16 in which the pressure rises or in the expanders 17 in which the pressure falls.

Here, the first stage compressor 16 and the second stage compressor 16 consume power (electricity) to compress a working fluid and increase pressure, and the first stage expander 17 and the second stage expander 17 generate power (electricity) by expanding a high-temperature, high-pressure working fluid.

However, the first pinion gear 15 driving the first stage compressor 16 and the second stage compressor 16 causes mechanical loss by transmitting the power required for the first stage compressor 16 and the second stage compressor 16.

In addition, the second pinion gear 15 driving the first stage expander 17 and the second stage expander 17 also causes mechanical loss by transmitting the power generated from the first stage expander 17 and the second stage expander 17.

CITATION LIST

[Patent Literature] Japanese Patent Publication No. 10-2007-332826 (published on Dec. 27, 2007)

DISCLOSURE

Technical Problem

Aspects of the present disclosure provide a compander capable of reducing thrust by making pressure distribution, which determines the thrust, similar on left and right sides by arranging a compressor and an expander in a manner that can reduce the thrust in a power generation system utilizing supercritical $CO_2$ ($sCO_2$).

Aspects of the present disclosure also provide a compander capable of using the same seal by making the distribution of pressure applied to left and right ends of a bull gear similar so as to make a leakage mechanism similar for a seal located in the middle, specifically, a dry gas seal (DGS) or a labyrinth seal.

Aspects of the present disclosure also provide a compander capable of reducing the imbalance amount of thrust in the conventional transition operation area by making the pressure applied to both ends similar even in the transition operation area, not at the design operation point of the compander.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

Technical Solution

According to an aspect of the present disclosure, a compander comprising:
a bull gear connected to a generator;
a first pinion member comprising least one first pinion provided on one side of the bull gear; and
a second pinion member comprising at least one second pinion provided on the other side of the bull gear,
wherein a first compressor and a first expander are mounted on the first pinion of the first pinion member, and
a second compressor and a second expander are mounted on the second pinion of the second pinion member.

According to an embodiment of the present disclosure, wherein the first compressor having a relatively low pressure and low temperature layout and the first expander having a relatively low pressure and low temperature layout are mounted on the first pinion, and the second compressor having a relatively high pressure and high temperature layout and the second expander having a relatively high pressure and high temperature layout are mounted on the second pinion.

According to an embodiment of the present disclosure, wherein the pressure and temperature of a working fluid increase from the first compressor toward the second compressor.

According to an embodiment of the present disclosure, wherein the pressure and temperature of the working fluid decrease from the second expander toward the first expander.

According to an embodiment of the present disclosure, wherein the first expander and the second expander are disposed on one side of the first pinion and one side of the second pinion to be adjacent to the generator, and the first compressor and the second compressor are disposed on the other side of the first pinion and the other side of the second pinion where the first compressor and the second compressor relatively do not interfere with the generator.

According to an embodiment of the present disclosure, wherein the first compressor and the second compressor are disposed on one side of the first pinion and one side of the second pinion to be adjacent to the generator, and the first expander and the second expander are disposed on the other side of the first pinion and the other side of the second pinion where the first expander and the second expander relatively do not interfere with the generator, According to an embodiment of the present disclosure, wherein the first pinion member comprising the first pinion and at least one third pinion is disposed in multiple stages on the one side of the bull gear, and the second pinion member comprising the second pinion and at least one fourth pinion is disposed in multiple stages on the other side of the bull gear.

According to an embodiment of the present disclosure, wherein the first compressor and the first expander mounted on the first pinion disposed in multiple stages on the one side of the bull gear and a third compressor and a third expander of the third pinion are provided in a number of stages equal to the number of stages of the second compressor and the second expander mounted on the second pinion disposed in multiple stages and a fourth compressor and a fourth expander disposed on the fourth pinion, so that the first compressor and the first expander, the third compressor and the third expander, the second compressor and the second expander, and the fourth compressor and the fourth expander are disposed on both sides of the first pinion and the second pinion by similar pressure levels.

According to an embodiment of the present disclosure, wherein the first and third expanders and the second and fourth expanders are disposed on one side of the first pinion and one side of the second pinion to be adjacent to the generator, and the first and third compressors and the second and fourth compressors are disposed on the other side of the first pinion and the other side of the second pinion where the first and third compressors and the second and fourth compressors relatively do not interfere with the generator.

According to an embodiment of the present disclosure, wherein the first and third compressors and the second and fourth compressors are disposed on one side of the first pinion and one side of the second pinion to be adjacent to the generator, and the first and third expanders and the second and fourth expanders are disposed on the other side of the first pinion and the other side of the second pinion where the first and third expanders and the second and fourth expanders relatively do not interfere with the generator.

Other details of the present disclosure are included in the detailed description and the drawings.

Advantageous Effects

A compander according to an embodiment of the present disclosure can reduce thrust by making pressure distribution, which determines the thrust, similar on left and right sides by arranging a low pressure compressor and a high pressure expander on one pinion gear and arranging a compressor corresponding to high pressure and an expander corresponding to low pressure on one pinion in a power generation system utilizing supercritical $CO_2$ ($sCO_2$).

In addition, in the compander according to the embodiment of the present disclosure, a compressor and an expander may be arranged on one pinion gear to make the distribution of pressure applied to left and right ends of a bull gear similar and accordingly make a leakage mechanism similar for a seal located in the middle, specifically, a dry gas seal (DGS) or a labyrinth seal. Therefore, the same seal can be used.

In addition, in the compander according to the embodiment of the present disclosure, since a compressor and an expander are mounted on one pinion, the power consumed by the compressor and the power generated by the expander cancel each other out. Therefore, only net power of the expander excluding the power consumed by the compressor may be transmitted to the pinion. This can reduce mechanical loss and improve the efficiency of the power generation system utilizing $sCO_2$.

The effects of the present invention are not limited to the above-described effects and other effects which are not described herein will become apparent to those skilled in the art from the following description.

MODE FOR INVENTION

Various changes may be made to embodiments the present disclosure, and the present disclosure may have various embodiments which will be described in detail with reference to the drawings. However, the embodiments according to concepts of the present disclosure are not construed as limited to the described embodiments, and include all changes, equivalents, or substitutes that do not depart from the spirit and technical scope of the present disclosure.

The terms used in the present disclosure are for the purpose of describing particular non-limiting example embodiments only and are not intended to be limiting. The singular forms are intended to include the plural forms as well, unless the context clearly indicates otherwise.

The term "include" or "has" used in the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined otherwise. The terms defined in a generally used dictionary should be interpreted as having meanings that are the same as or similar with the contextual meanings of the relevant technology and should not be interpreted as having ideal or exaggerated meanings unless they are clearly defined in the present disclosure.

Hereinafter, the present disclosure will be described with reference to the drawings for explaining companders 100 according to embodiments of the present disclosure.

Figure 2A:
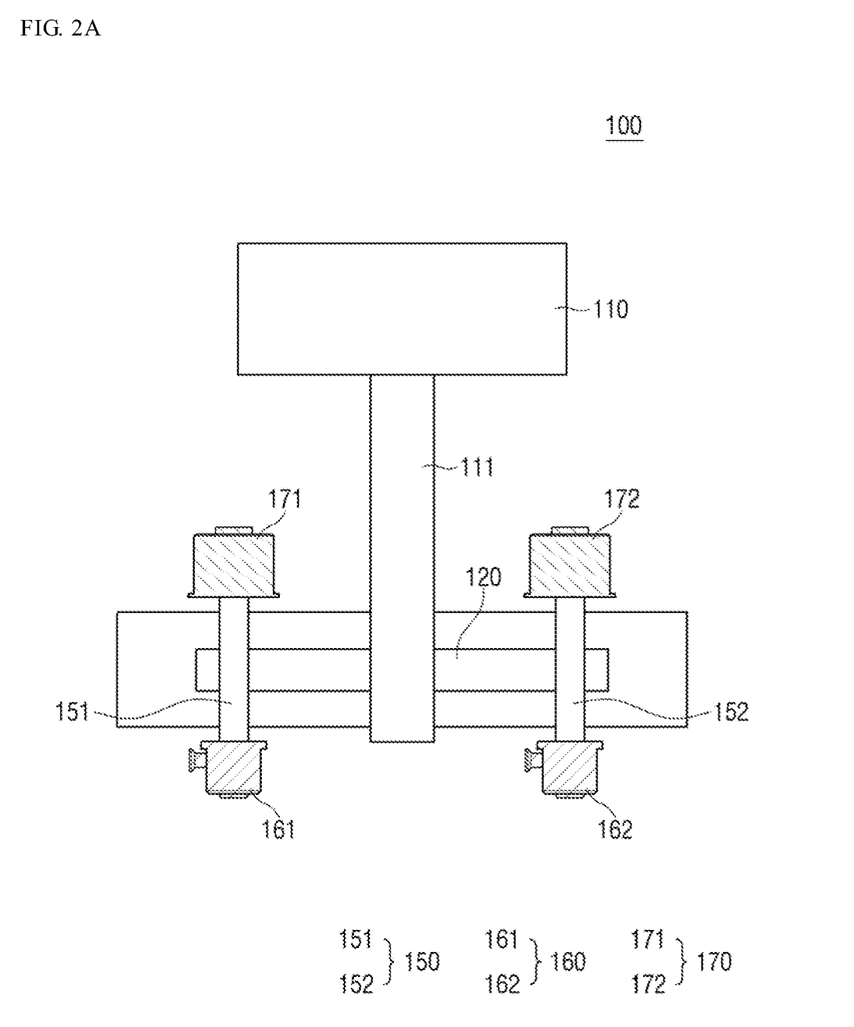
FIG. 2A schematically illustrates the planar arrangement of compressors and expanders in a compander according to an embodiment of the present disclosure.

FIG. 2A schematically illustrates the planar arrangement of compressors and expanders in a compander 100 according to an embodiment of the present disclosure.

Figure 2B:
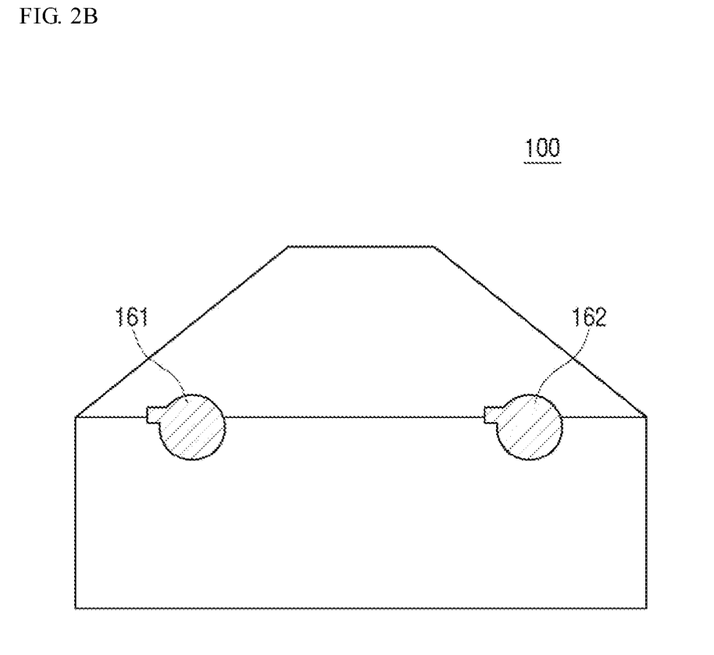
FIG. 2B schematically illustrates the front arrangement of the compressors and the expanders in the compander according to the embodiment of the present disclosure.

FIG. 2B schematically illustrates the front arrangement of the compressors and the expanders in the compander 100 according to the embodiment of the present disclosure.

Referring to FIGS. 2A and 2B, the compander 100 according to the embodiment of the present disclosure includes a generator 110, a bull gear 120, a pinion member 150, a compression member 160, and an expander member 170.

The bull gear 120 may be connected to the generator 110, and the pinion member 150 on which the compression member 160 and the expander member 170 are mounted may be provided on both sides of the bull gear 120 with respect to an axis of the generator 110.

The pinion member 150 may include a first pinion 151 and a second pinion 152.

The first pinion 151 may be disposed in one or more stages on one side of the bull gear 120. The second pinion 152 may be disposed in one or more stages on the other side of the bull gear 120.

Figure 3A:
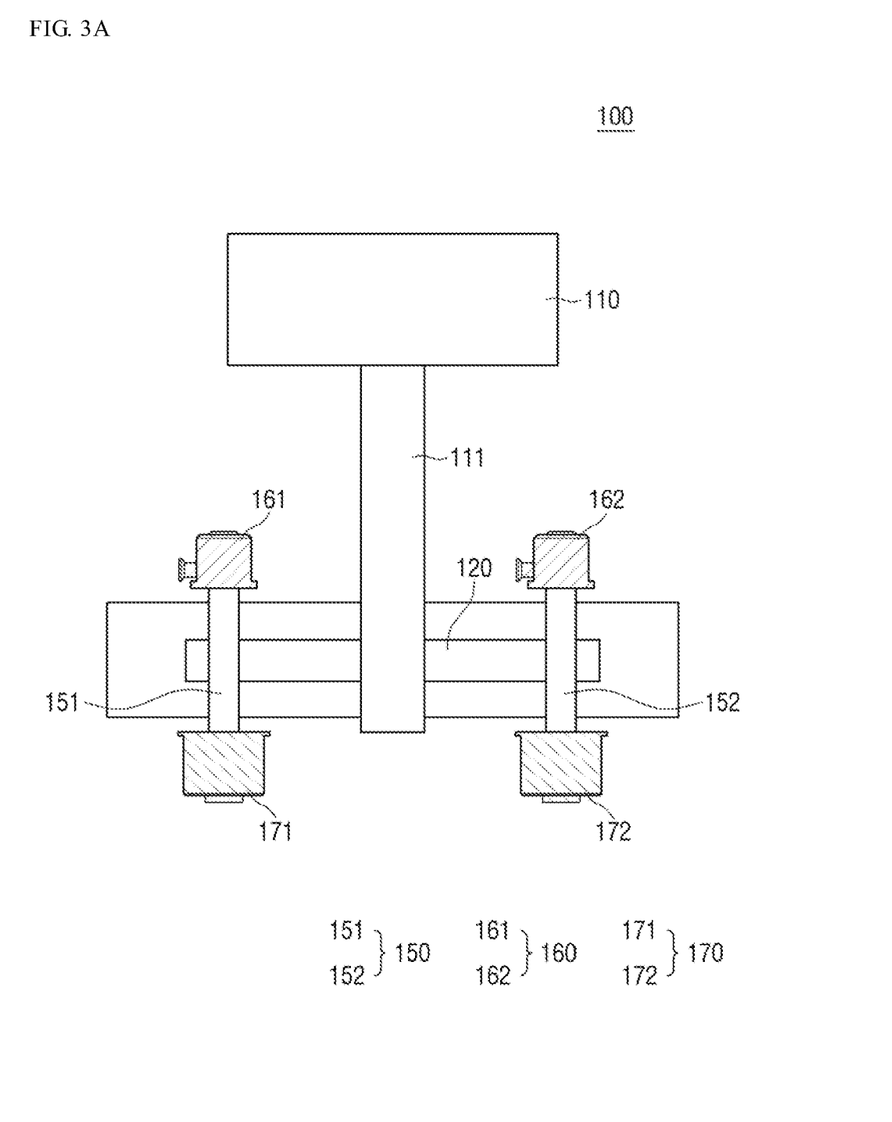
FIG. 3A schematically illustrates the planar arrangement of compressors and expanders according to another embodiment in the compander according to the embodiment of the present disclosure.
Figure 3B:
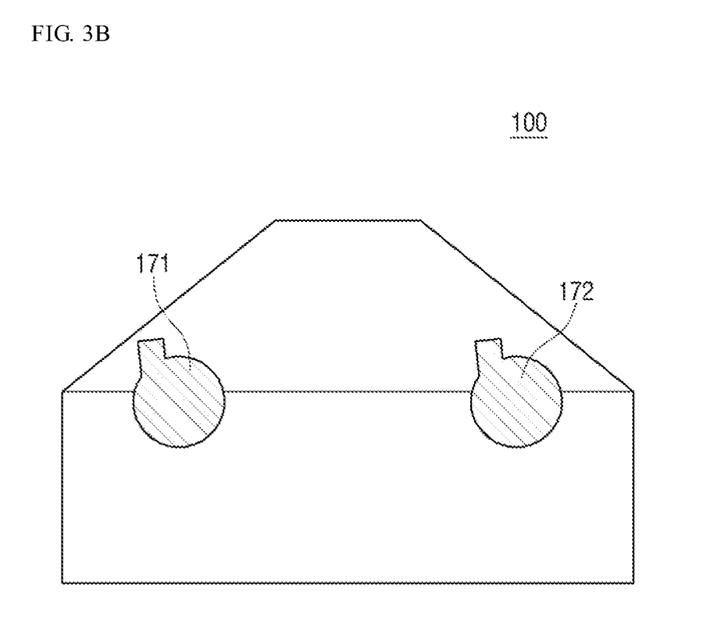
FIG. 3B schematically illustrates the front arrangement of the compressors and the expanders according to another embodiment in the compander according to the embodiment of the present disclosure.
Figure 4A:
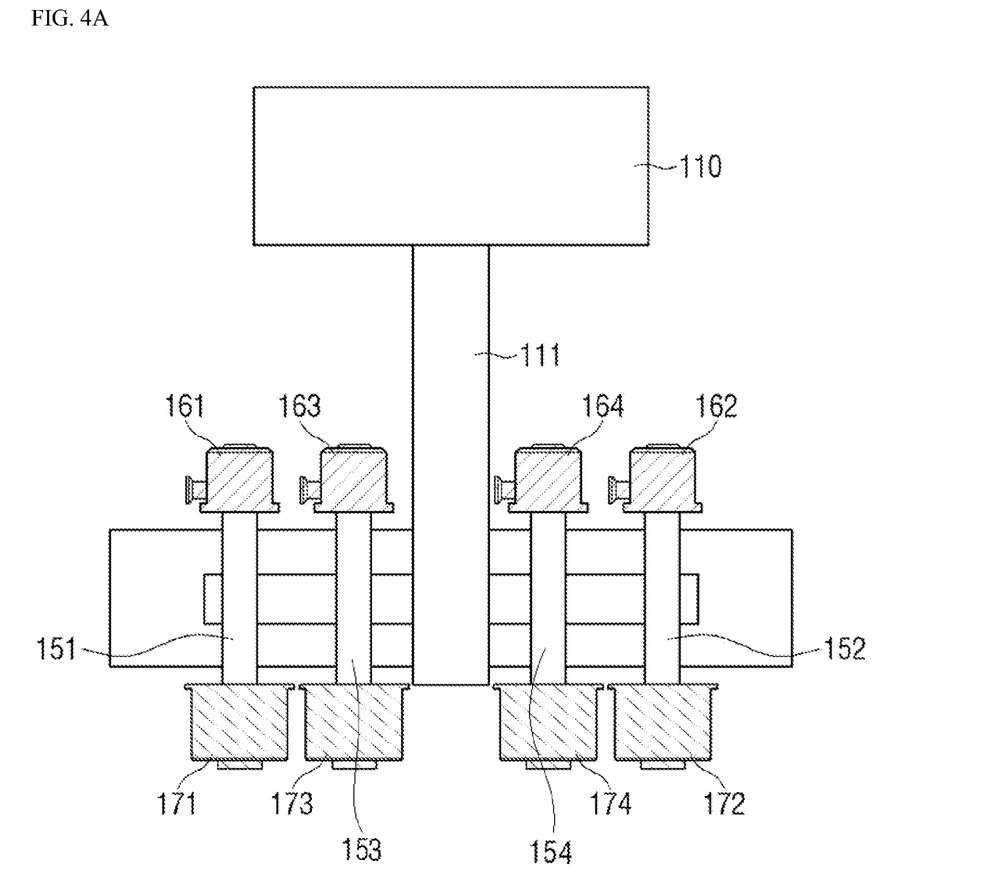
FIG. 4A schematically illustrates the planar arrangement of compressors and expanders according to another embodiment in the compander according to the embodiment of the present disclosure.
Figure 4B:
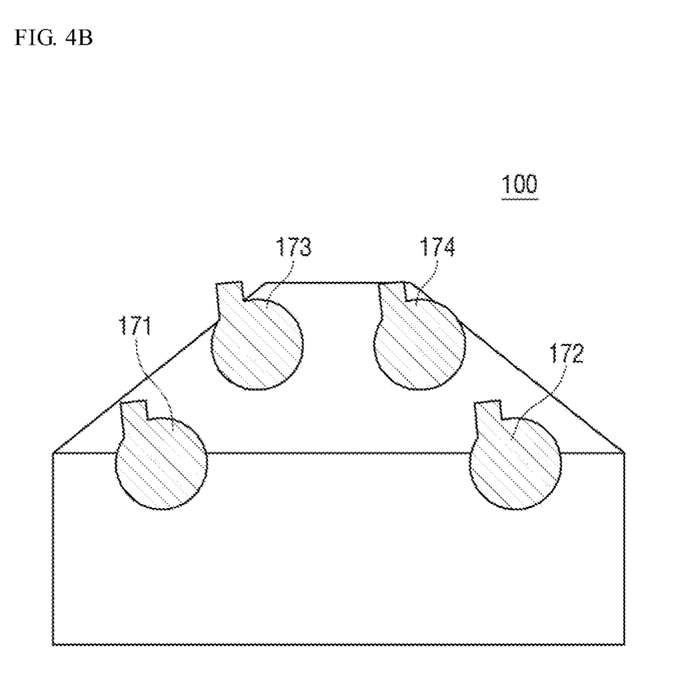
FIG. 4B schematically illustrates the front arrangement of the compressors and the expanders according to another embodiment in the compander according to the embodiment of the present disclosure.

For example, one first pinion 151 and one second pinion 152 may be respectively disposed on one side and the other side of the bull gear 120 as illustrated in FIGS. 2A and 2B as swell as in FIGS. 3A and 3B to be described later, or two first pinions 151 and two second pinions 152 may be respectively disposed on one side and the other side of the bull gear 120 as illustrated in FIGS. 4A and 4B to be described later.

The compression member 160 may consume power (electricity) to compress a working fluid and increase pressure and may be disposed on one of both sides of each of the first pinion 151 and the second pinion 152.

The expander member 170 may generate power (electricity) by expanding a high-temperature, high-pressure working fluid and may be disposed on the other one of both sides of each of the first pinion 151 and the second pinion 152, together with the compression member 160.

Specifically, as in the present disclosure, one first pinion 151 may be configured on one side of the bull gear 120, and one second pinion 152 may be configured on the other side of the bull gear 120. In this case, the compression member 160 may include a first compressor 161 and a second compressor 162 configured on the one first pinion 151 and the one second pinion 152, respectively. In addition, the expander member 170 may include a first expander 171 and a second expander 172 configured on the one first pinion 151 and the one second pinion 152, respectively.

In addition, the first compressor 161 of the compression member 160 and the first expander 171 of the expander member 170 may be mounted on the first pinion 151, and the second compressor 162 of the compression member 160 and the second expander 172 of the expander member 170 may be mounted on the second pinion 152.

The compander 100 of the present disclosure may be configured to have a layout in which the pressure and temperature of a working fluid increase from the first compressor 161 toward the second compressor 162. In addition, it may be configured to have a layout in which the pressure and the temperature of the working fluid decrease from the second expander toward the first expander 171.

That is, the first compressor 161 having a relatively low pressure and low temperature layout and the first expander 171 having a relatively low pressure and low temperature layout may be mounted on the first pinion 151. In addition, the second compressor 162 having a relatively high pressure and high temperature layout and the second expander 172 having a relatively high pressure and high temperature layout may be mounted on the second pinion 152.

In an embodiment of the present disclosure, the first expander 171 and the second expander 172 may be respectively mounted on one side of the first pinion 151 and one side of the second pinion 152 so that they are adjacent to the generator 110. Accordingly, the first compressor 161 and the second compressor 162 may be respectively mounted on the other side of the first pinion 151 and the other side of the second pinion 152 where they relatively do not interfere with the generator 110.

Therefore, as described above, in the compander 100 according to the embodiment of the present disclosure, the first compressor 161 and the first expander 171 corresponding to low temperature and low pressure are mounted on the same pinion member 150, specifically the first pinion 151. In addition, the second compressor 162 and the second expander 172 corresponding to high temperature and high pressure are mounted on the same pinion member 150, specifically, the second pinion 152. Accordingly, the pressure applied to an impeller of the first compressor 161 and the pressure applied to a wheel of the first expander 171 become similar, and the pressure applied to an impeller of the second compressor 162 and the pressure applied to a wheel of the second expander 172 become similar. Since the pressure applied to the impeller of the compression member and the pressure applied to the wheel of the expander member 170 become similar as described above, pressure distribution, which determines thrust, becomes similar around the bull gear 120, thus reducing the thrust.

In addition, since the compression member 160 and the expander member are disposed on one pinion gear, it is possible to make the distribution of pressure applied to left and right ends of the bull gear 120 similar and accordingly make a leakage mechanism similar for a seal located in the middle, specifically, a dry gas seal (DGS) or a labyrinth seal. Therefore, the same seal can be used.

In addition, even in a transitional operation region of the compander 100, the pressure applied to both ends of one pinion is similar. Therefore, the amount of unbalance of thrust in the transitional operation region can be significantly reduced.

In addition, since a compressor and an expander are disposed at both ends of one pinion as described above, the power consumed by the first compressor 161 and the power generated by the first expander 171 cancel each other out, and the power consumed by the second compressor 162 and the power generated by the second expander 172 cancel each other out. Therefore, only net power of the first expander 171 or the second expander 172 excluding the power consumed by the first compressor 161 or the second compressor 152 is finally transmitted to each of the first pinion 151 and the second pinion 152. Accordingly, this reduces a corresponding mechanical loss. For example, it is possible to achieve a breakthrough efficiency improvement that reduces machine loss by more than 40% and increases the efficiency of the entire $sCO_2$ engine by about 1.5%.

FIG. 3A schematically illustrates the planar arrangement of compressors and expanders according to another embodiment in the compander 100 according to the embodiment of the present disclosure.

FIG. 3B schematically illustrates the front arrangement of the compressors and the expanders according to another embodiment in the compander 100 according to the embodiment of the present disclosure.

First, the compander 100 of the present disclosure in FIGS. 3A and 3B discloses the same configuration as the compander 100 of FIGS. 2A and 2B. However, they are different in mounting positions of a compression member 160 and an expander member 170 on a pinion member 150. Therefore, in the description of the embodiment of the present disclosure, the description of the previous embodiment may apply to the same configurations and structures as those of the previous embodiment. In addition, configurations and structures different from those of the previous embodiment may be described below.

Referring to FIGS. 3A and 3B, the compander 100 according to the embodiment of the present disclosure has all of the elements of the compander 100 according to the previous embodiment, but is different from the previous embodiment in the mounting positions of the compression member 160 and the expander member 170 on the pinion member 150.

That is, when the expander member 170 interferes with the generator 110 due to the arrangement of a shaft and other elements of the generator 110, the expander member 170 may be mounted at a position where it does not interfere with the generator 110, that is, may be mounted on the other side of the pinion member to additionally secure a space.

Specifically, a first compressor 161 and a second compressor 162 may be disposed on one side of a first pinion 151 and one side of a second pinion 152 so that they are adjacent to the generator 110, and a first expander 171 and a second expander 172 may be disposed on the other side of the first pinion 151 and the other side of the second pinion 152 where they relatively do not interfere with the generator 110.

That is, the first compressor 161 having a relatively low pressure and low temperature layout and the first expander 171 having a relatively low pressure and low temperature layout may be mounted on the first pinion 151. Here, the first compressor 161 may be mounted on one side of the first pinion 151 which is adjacent to the generator 110, and the first expander 171 may be mounted on the other side of the first pinion 151.

In addition, the second compressor 162 having a relatively high pressure and high temperature layout and the second expander 172 having a relatively high pressure and high temperature layout may be mounted on the second pinion 152. Here, the second compressor 162 may be mounted on one side of the second pinion 152 which is adjacent to the generator 110, and the second expander 172 may be mounted on the other side of the second pinion 152.

Therefore, in the embodiment of the present disclosure, the first compressor 161 and the second compressor 162 may be respectively mounted on the one side of the first pinion 151 and the one side of the second pinion 152 to be adjacent to the generator 110.

FIG. 4A schematically illustrates the planar arrangement of compressors and expanders according to another embodiment in the compander 100 according to the embodiment of the present disclosure.

FIG. 4B schematically illustrates the front arrangement of the compressors and the expanders according to another embodiment in the compander 100 according to the embodiment of the present disclosure.

First, the compander 100 of the present disclosure in FIGS. 4A and 4B discloses the same configuration as the compander 100 of FIGS. 3A and 3B. However, it is different from the previous structures in that a mounting member 150 on which a compression member 160 and an expander member 170 are mounted is mounted in plural numbers. Therefore, in the description of the embodiment of the present disclosure, the description of the previous embodiments may apply to the same configurations and structures as those of the previous embodiments. In addition, configurations and structures different from those of the previous embodiments may be described below.

Referring to FIGS. 4A and 4B, a first pinion 151 and a second pinion 152 may be disposed in two or more stages on one side and the other side of the bull gear 120, respectively. Here, a first compressor 161 and a first expander 171 may be provided in a number of stages equal to the number of stages of a second compressor 162 and a second expander 172, so that they are disposed on both sides of the first pinion 151 and the second pinion 152 by similar pressure levels.

Specifically, as illustrated in FIGS. 4A and 4B, four pinions, two on each of both sides of the bull gear 120 with respect to the generator 110, may be provided (in the order of a first pinion 151, a third pinion 153, a fourth pinion 154 and a second pinion 152). Here, the first pinion 151 and the third pinion 153 may be disposed on one side of the bull gear 120, and the fourth pinion 154 and the second pinion 152 may be disposed on the other side of the bull gear 120.

In addition, a compressor and an expander may be mounted on both sides of each pinion (the first through fourth pinions 154), respectively.

Here, the lowest pressure and lowest temperature compressor (the first compressor 161) and the lowest pressure and lowest temperature expander (the first expander 171) may be disposed on the first pinion 151. In addition, the highest pressure and highest temperature compressor (the second compressor 162) and the highest pressure and highest temperature expander (the second expander 172) may be disposed on the second pinion 152.

In addition, the second lowest pressure and second lowest temperature compressor (the third compressor 163) and the second lowest pressure and second lowest temperature expander (the third expander 173) may be disposed on the third pinion 153, and the second highest pressure and second highest temperature compressor (the fourth compressor 164) and the second highest pressure and second highest temperature expander (the fourth expander 174) may be disposed on the fourth pinion 154.

In addition, in the embodiment of the present disclosure, the compression member 160 becomes high temperature and high pressure from the first compressor 161 toward the fourth compressor 164, and the expander member 170 becomes low temperature and low pressure from the first expander 171 toward the fourth compressor 164.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

EXPLANATION OF SIGNS

100: compander
110: generator
111 axis
120: bull gear
150: pinion member
151: first pinion
152: second pinion
153: third pinion
154: fourth pinion
160: compression member
161: first compressor
162: second compressor
163: third compressor
164: fourth compressor
170: expander member
171: first expander
172: second expander
173: third expander
174: fourth expander

The invention claimed is:

1. A compander comprising:
a bull gear connected to a generator;
a first pinion member comprising at least one first pinion and at least one third pinion provided on a first side of the bull gear; and
a second pinion member comprising at least one second pinion and at least one fourth pinion provided on a second side of the bull gear,
wherein a first compressor and a first expander are mounted on the at least one first pinion,
wherein a second compressor and a second expander are mounted on the at least one second pinion,
wherein a third compressor and a third expander are mounted on the at least one third pinion,
wherein a fourth compressor and a fourth expander are mounted on the at least one fourth pinion,
wherein the first and third expanders and the second and fourth expanders are respectively disposed on a first side of the first pinion member and a first side of the second pinion member, and the first and third compressors and the second and fourth compressors are respectively disposed on a second side of the first pinion member and a second side of the second pinion member, such that the first and third compressors and the second and fourth compressors are distanced further from the generator than the first and third expanders and the second and fourth expanders.

2. The compander of claim 1, wherein the first compressor having a relatively low pressure and low temperature layout and the first expander having a relatively low pressure and low temperature layout are mounted on the at least one first pinion, and the second compressor having a relatively high pressure and high temperature layout and the second expander having a relatively high pressure and high temperature layout are mounted on the at least one second pinion.

3. The compander of claim 2, wherein a pressure and a temperature of a working fluid at the first compressor are less than the pressure and the temperature of the working fluid at the second compressor, respectively.

4. The compander of claim 2, wherein a pressure and a temperature of a working fluid at the second expander are greater than the pressure and the temperature of the working fluid at the first expander, respectively.

5. The compander of claim 1, wherein the first compressor and the first expander of the at least one first pinion and the third compressor and the third expander of the at least one third pinion are provided in a number of stages equal to a number of stages of the second compressor and the second expander of the at least one second pinion and the fourth compressor and the fourth expander disposed on the at least one fourth pinion, and
wherein the first compressor and the first expander, the third compressor and the third expander, the fourth compressor and the fourth expander and the second compressor and the second expander are arranged in order of pressure levels such that the first compressor and the first expander have a lowest pressure, the third compressor and the third expander have a second lowest pressure, the fourth compressor and the fourth expander have a second highest pressure, and the second compressor and the second expander have a highest pressure.

* * * * *